July 2, 1940.    R. K. BERNHARD    2,206,386
TESTING APPARATUS
Filed Oct. 25, 1938    2 Sheets-Sheet 1

WITNESSES:    INVENTOR:

July 2, 1940.  R. K. BERNHARD  2,206,386

TESTING APPARATUS

Filed Oct. 25, 1938  2 Sheets-Sheet 2

WITNESSES:

INVENTOR:

Patented July 2, 1940

2,206,386

UNITED STATES PATENT OFFICE 2,206,386

TESTING APPARATUS

Rudolf K. Bernhard, State College, Pa.

Application October 25, 1938, Serial No. 236,892

6 Claims. (Cl. 74—61)

This invention relates generally to an apparatus hereinafter to be called oscillator, for producing forces or moments for the purpose of testing the dynamic characteristics of specimens, structures, highways, soils, dams, and other materials.

There have been prior devices proposed serving these purposes, in which, however, the amplitude and frequency of the pulsating forces and moments could not be altered independently from one another.

Furthermore, prior arrangements have been deficient in various respects, including the inability to subject the object to be tested to an alternating load along a true sine curve and to obtain a continuous and wide range from low to high amplitudes.

Other deficiencies have been the inability to control the upper and lower limit, both of frequency and amplitude, while the test is under way, with a high degree of accuracy and sensitivity, regardless of whether the limits were relatively low or high, of small or large differentials.

Any hydraulic testing machine with piston and cylinder where maximum and minimum loads are adjusted by means of blow off valves, does not excite a pure sine form of impulses.

Furthermore, the moving masses in any other type of machine will prevent the application of higher frequencies.

Finally, no prior machine, based on the application of centrifugal forces, could avoid the disadvantage that the forces are increasing with the angular speed.

One object of my invention is to provide for the alteration of both the amplitude and the frequency of the pulsating forces or moments, either manually at the will of the operator, or automatically through the action of speed-responsive or deformation-responsive controlling means.

Another object of my invention is to bring the testing apparatus to the specimen, structure, or soil in the field and not, as in the previous practice, to bring the specimen, structure, or soil to the testing machine in the laboratory, hence destroying the natural conditions prevailing in the field.

Yet another object of this invention is to provide improved apparatus and control systems, together with improved load responsive and load filtering means, whereby all foregoing deficiencies may be substantially, if not wholly, overcome and at the same time obtaining a high degree of sensitivity and ease and rapidity of adjustment of the load and frequency limits, as well as widely ranging load and frequency differentials between such limits.

A further object of my invention is to accomplish the foregoing desirable results in an apparatus which, considering the sensitivity of control and accuracy necessary, is relatively economical in manufacture, operation, and maintenance.

In one specific case of my invention I have provided a meter to measure the power input in the main driving motor. Plotting the power input of this motor against the testing frequency, so-called resonance curves can be obtained and the dynamic qualities of the specimen, structure or soil, such as natural frequency, resonance points, damping capacity, fatigue cracks, impact factors, aging effects, and other characteristics can be determined.

A still further object of the invention is to facilitate, in virtue of my apparatus being easily portable and capable of changing only the frequency or only the amplitude of the induced vibrations, the measurement by means of seismographs of the propagation speed of the waves in soils, dams, fills and highways, excited by the oscillator, in order to determine the bearing capacity, modulus of elasticity, rigidity, thickness of underlying strata, and other characteristics.

Finally, the object of the invention is to densify and hence improve various soils and fills by moving the apparatus gradually, or in steps, over the area to be densified, vibrating the subsoil at or near its natural frequencies.

In the particular form of the invention, such as described herein merely for the purpose of illustrating one specific form among possible others that the invention might take in practice, I have shown in:

Figure 1 a sectional elevation of the oscillator for producing pulsating loads along section A—A of Figure 2.

Figure 2 a sectional plan view of the oscillator for producing pulsating loads along section B—B of Figure 1.

Figure 3 a diagrammatic sketch of the set-up during one period for exciting minimum, i. e., zero, vibration.

Figure 4 a diagrammatic sketch of the set-up during one period for exciting maximum vertical vibrations.

Figure 5 a diagrammatic sketch of the set-up during one period for exciting maximum horizontal vibrations.

Figure 6 a diagrammatic sketch of the set-up during one period for exciting maximum torsional vibrations in a vertical plane.

Figure 7 diagrammatically the corresponding values of impulses during the one period illustrated in Figures 4, 5 and 6.

I have shown in Figure 1 a sectional elevation of the oscillator. The two wheels 1 and 2 are meshed by their toothed rims and are holding the two weights 6 and 7 in a predetermined position. The two corresponding wheels 3 and 4, as shown in Figure 2, are holding the two weights 5 and 8. Hence, the two pairs of wheels and two pairs of weights rotate with the same speed, in this particular case, however, in opposite directions.

The two weights 6 and 7 are shown in an intermediate position with respect to the two weights 5 and 8, hence the centers of gravity of the four weights have an intermediate deviation from the two centers of rotation. Rotating the four wheels, including the four weights, in the position as shown in Figure 1, an intermediate value of resultant centrifugal forces and hence, an intermediate magnitude of impulses will be excited. Rotating, however, with the four weights in a diametrically opposite position, no resultant centrifugal forces and hence, no impulses, will be excited.

All four weights can be made of interchangeable cylinders of various materials, with various specific weights, in order to increase the differences between maximum and zero impulses.

Figure 2 represents a sectional plan view of the oscillator. The first pair of wheels 1, 2 are driven by the bevel gears 9 and 10 through the connecting shafts 11 and 12, respectively. Shaft 11 may be driven by an electric, air- or gas motor connected at the shaft coupling 13. The second pair of wheels 3, 4 is driven by the bevel gears 14 and 15 through the connecting shafts 16 and 17, respectively. The weights 5 and 8 are positively connected with the second pair of wheels 3, 4 and hence, also maintain their relative position to each other. The differential gears (18, 19, 20, 21) connect the two shafts 11 and 16 and hence, the two pairs of wheels or weights, respectively, and allow, while the oscillator is running, a continuous change of phase displacement between the two pairs of weights and hence, permit a continuous control of the magnitude of impulses from zero to maximum. The spider shaft 22 stands still, as a rule, while the machine is running. However, the angular position of the spider shaft 22 can be changed, thus changing the relative position of the two weights 5 and 6 (and simultaneously the relative position of the two weights 7 and 8). The relative position of weight 5 is changed through wheels 3 and 4, shaft 17, gears 15 and 14, shaft 16, and differential gears 19, 20, and 21, and finally, the spider shaft 22. Weight 6 is directly connected through shaft 12, gears 10 and 9, shaft 11, and differential gears 18, 20, and 21 to the spider shaft 22. If, for example, the weights 5 and 6 or 7 and 8 are opposite to each other as shown in Fig. 3, the effective eccentricity is zero. In Fig. 1, the weights are shown in a half-way position, with, therefore, an intermediate effective eccentricity.

The position of the spider 22 of the differential gear can be controlled by hand or automatically. In case an automatic control of constant force is desired, this can be achieved by any centrifugal or shaft governor, driven from the shaft coupling 23 and acting upon the spider 22.

In case a constant stress, deflection, or deformation is desired, the automatic control can be achieved by a servo-motor, which is energized by electric contacts set for a predetermined maximum or minimum stress, deflection, or deformation, and acts upon the spider 22.

Figures 3 to 7 show diagrammatically the positions of the weights 5, 6, 7, 8 during one revolution and the corresponding centrifugal forces or impulses, respectively. Position I indicates the state for 0°, position II for 90°, position III for 180°, position IV for 270°, and position V for 360°.

Figure 5:
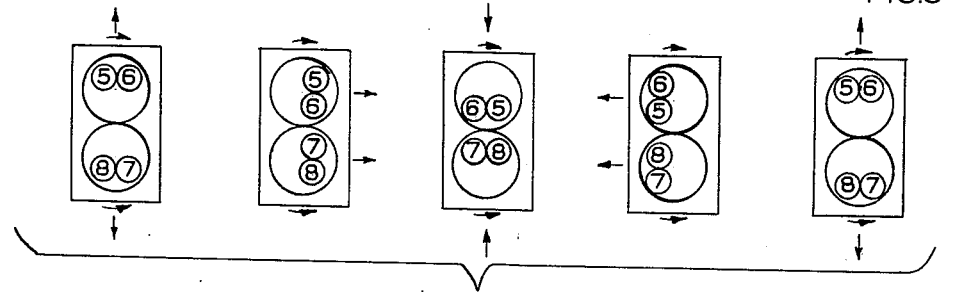

Figure 5 shows the set-up for maximum horizontal impulses. The oscillator is set up vertically, i. e., the former horizontal side is now vertical. Both pairs of weights (5, 6 and 7, 8) are rotating in opposite directions and in their maximum eccentric position. The vertical centrifugal forces neutralize each other in positions I, III and V.

Figure 6:
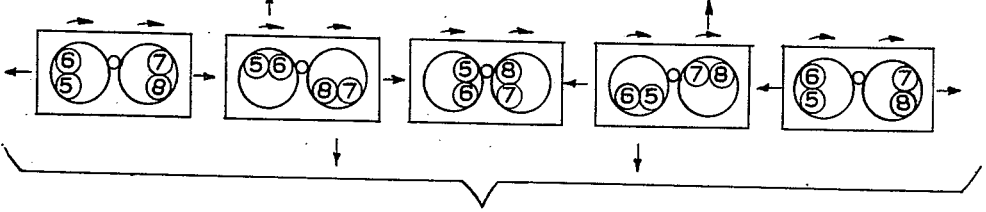

Figure 6 shows the set-up for maximum pure torsional vibration in a vertical plane. In this particular case both pairs of wheels (5, 6 and 7, 8) are rotating in the same direction, however with a difference in phase of the weights (5, 6 and 7, 8) of 180°.

Figure 1:
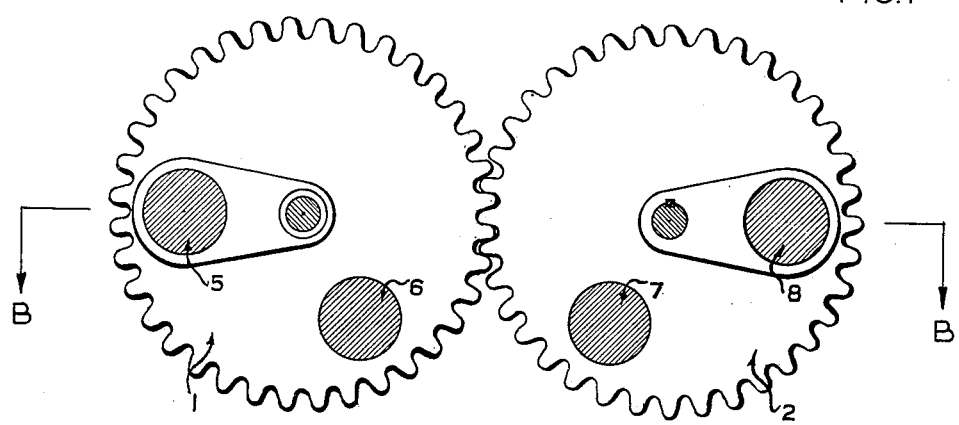
Figure 2:
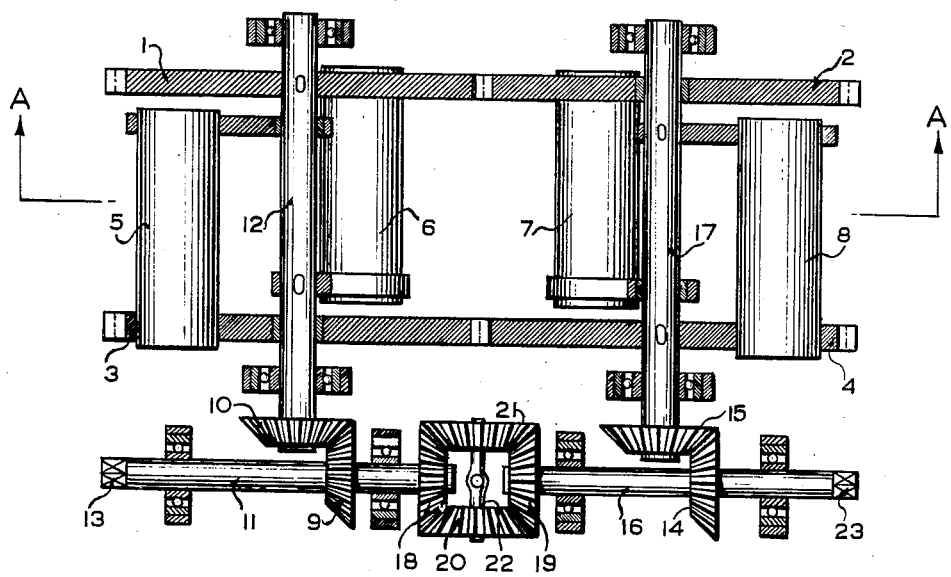
Figure 3:
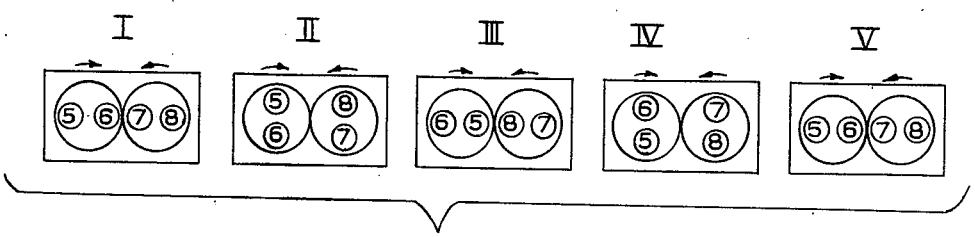
Figure 3 shows both pairs of weights 5, 6 and 7, 8 in opposite positions, hence, no centrifugal forces or impulses can be excited.
Figure 4:
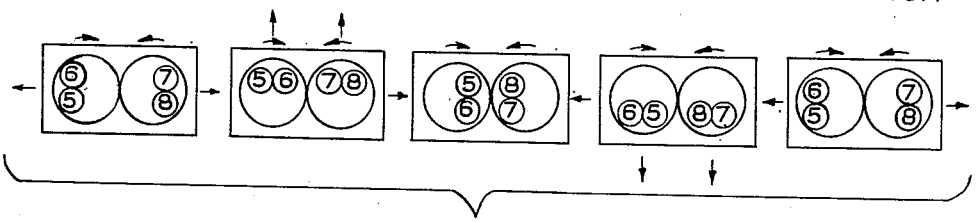
Figure 4 shows both weights 5, 6 and 7, 8 in their maximum eccentric position and rotating in opposite directions. Hence, the maximum centrifugal forces or maximum impulses are excited.
Figure 7:
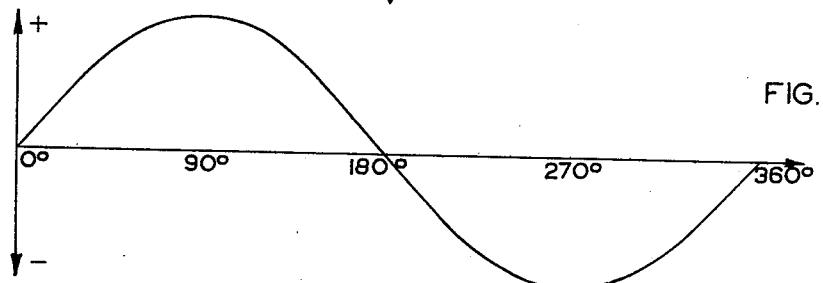

Figure 7 shows the true sine curve of impulses, excited during one revolution, corresponding to the position of the weights in Figures 4, 5, and 6.

In a similar way all possible types of vibrations in any direction or plane can be excited with a continuously variable frequency and amplitude range.

It will, of course, be understood that various changes in details of construction and details of parts may be made by those skilled in the art without departing from the spirit of the invention as set forth in the appended claims.

In operation, the oscillator may be utilized in connection with any testing machine, structure, soil or dam. The oscillator is operated by eccentrically supported weights rotating at different speeds and hence, causing centrifugal forces of various sizes in order to carry out tests with changing loads, frequencies, stresses, deflections or deformations.

The oscillator, according to the particular form as disclosed herein, comprises at least two or more rotating wheels; each wheel comprises two or more weights. Instead of two or more wheels and weights, one or more pairs of cylinders in an eccentric arrangement can be used. Shifting the weights or eccentrics in such position as to cause an eccentricity within the mass distribution of each pair of wheels, any type of sinusoidal load impulses in every required direction, hence, independent of the forces of gravity, can be excited. These load impulses do not occur as shocks, but according to the sine law.

While operating, the velocity with which these impulses follow depends on the angular speed with which the oscillator runs.

The magnitude of the impulses depends on the relative position of the weights or eccentrics and the upper limit is given when both pairs of weights or eccentrics are on one side of each pair of wheels, the lower limit when both are on opposite sides of each pair of wheels.

In order to secure a pure sine curve of the impulses, both wheels or eccentrics rotate with the same speed and in opposite or the same directions, and the center of gravity of both pairs of weights or eccentrics is always equi-distant from the plane of symmetry between both centers of rotation.

In order to maintain, while operating, the magnitude of the impulses, independent of the angular velocity of the rotating systems, it is necessary to alter the relative position of the weights or eccentrics. This is obtained by producing a phase displacement between both pairs of weights or eccentrics. One pair of wheels and hence, one pair of weights or eccentrics are positively connected to each other. The phase displacement is obtained either manually or by the adjustable differential gear arrangement or may be obtained by an adjustable helical gear arrangement. By this means the device produces sinusoidal impulses which can be kept constant throughout the test.

In operation, the device may therefore be used for carrying out fatigue or endurance tests until a rupture or destruction of the test specimen or structure takes place. The limits within which the load varies in a test can be fixed or altered while the device is running.

I claim:

1. A device for producing harmonically pulsating forces of adjustable amplitude and frequency comprising in combination a housing, two parallel shafts rotatably supported in said housing, on each of said shafts two weights eccentrically arranged, one weight being rigidly connected, the other weight being rotatably fitted to each of said shafts, a differential gearing interposed between said two shafts for changing the angle between the rigidly connected and the rotatably fitted weights and for rotating said two shafts at the same speed and in direction opposite to one another.

2. A device for producing harmonically pulsating forces of adjustable amplitude and frequency comprising in combination a housing, two parallel shafts rotatably supported in said housing, on each of said shafts two weights eccentrically arranged, one weight being rigidly connected, the other weight being rotatably fitted to each of said shafts, a differential gearing interposed between said two shafts, means for rotating said two shafts at the same speed and in direction opposite to one another, automatic speed responsive controlling means for altering, while the machine is running; the angle between the rigidly connected and rotatably fitted weights so as to keep the resultant centrifugal force of said weights constant at variable rotating speeds.

3. A device for producing harmonically pulsating forces of adjustable amplitude and frequency comprising in combination a housing, two parallel shafts rotatably supported in said housing, on each of said shafts two weights eccentrically arranged, one weight being rigidly connected, the other weight being rotatably fitted to each of said shafts, a differential gearing interposed between said two shafts, means for rotating said two shafts at the same speed and in direction opposite to one another, automatic deformation-responsive controlling means for altering, while the machine is running, the angle between the rigidly connected and rotatably fitted weights so as to keep the resultant deformation of the objects to be tested constant at variable rotating speeds.

4. A device for producing harmonically pulsating moments of adjustable amplitude and frequency comprising in combination a housing, two parallel shafts rotatably supported in said housing, on each of said shafts two weights eccentrically arranged, one weight being rigidly connected, the other weight being rotatably fitted to each of said shafts, a differential gearing interposed between said two shafts for changing, while the machine is running, the angle between the rigidly connected and the rotatably fitted weights and for rotating said two shafts at the same speed and direction.

5. A device for producing harmonically pulsating moments of adjustable amplitude and frequency comprising in combination a housing, two parallel shafts rotatably supported in said housing, on each of said shafts two weights eccentrically arranged, one weight being rigidly connected, the other weight being rotatably fitted to each of said shafts, a differential gearing interposed between said two shafts, means for rotating said two shafts at the same speed and direction, automatic speed responsive controlling means for altering, while the machine is running, the angle between the rigidly connected and rotatably fitted weights so as to keep the resultant centrifugal forces of said weights constant at variable rotating speeds.

6. A device for producing harmonically pulsating moments of adjustable amplitude and frequency comprising in combination a housing, two parallel shafts rotatably supported in said housing, on each of said shafts two weights eccentrically arranged, one weight being rigidly connected, the other weight being rotatably fitted to each of said shafts, a differential gearing interposed between said two shafts, means for rotating said two shafts at the same speed and direction, automatic deformation-responsive controlling means for altering, while the machine is running, the angle between the rigidly connected and rotatably fitted weights so as to keep the resultant deformation of objects to be tested constant at variable rotating speeds.

RUDOLF K. BERNHARD.